July 10, 1962 J. R. ANDERSON ETAL 3,042,997

METHOD OF MAKING MAGNETIC DATA STORAGE DEVICES

Filed Nov. 18, 1957

INVENTORS
JOHN R. ANDERSON &
RICHARD M. CLINEHENS

BY Louis A Kline
J Cavender

THEIR ATTORNEYS

United States Patent Office 3,042,997

Patented July 10, 1962

3,042,997

METHOD OF MAKING MAGNETIC DATA STORAGE DEVICES

John R. Anderson and Richard M. Clinehens, Dayton, Ohio, assignors to The National Cash Register Company, Dayton, Ohio, a corporation of Maryland Filed Nov. 18, 1957, Ser. No. 696,987
9 Claims. (Cl. 29—155.5)

The present invention relates generally to storage devices and more particularly relates to a new and improved method of fabricating a high-speed magnetic data storage device adaptable for use as a memory element for present-day computers and data processors.

Present-day storage devices employed in coincident current memories are normally in the form of toroidal shaped magnetic cores having a relatively high magnetic remanent induction and a substantially rectangular hysteresis characteristic. A memory utilizing such magnetic cores is shown and described in an article entitled "Digital Information Storage in Three Dimensions Using Magnetic Cores," Journal of Applied Physics, volume 22, page 44, January 1951, by J. W. Forrester. A more recent description is found in an article by Brown and Albers-Schoenberg entitled "Ferrites Speed Digital Computers," page 146, April 1953 issue of "Electronics," published by McGraw-Hill Publishing Company.

Even though toroidal cores are admirably well suited as storage devices, they nevertheless are extremely fragile and quite difficult to fabricate, and require the expenditure of a considerable amount of time and effort in order to be connected into the memory circuit. In an attempt to alleviate some of these problems, there has been developed a magnetic storage device commonly known as a "twistor." Such a device comprises a length of non-magnetic electrically conductive wire, constituting a common core, and a co-axial layer of saturable ferromagnetic material extruded on the outermost surface of the core. The core, along with the ferromagnetic coating, is simultaneously stretched and twisted, and the ends thereof are thereafter held in a fixed position. As a result of the stretching and twisting, the easy direction of magnetization of the coating is oriented from a direction substantially parallel to the longitudinal axis of the core to one of a substantially helical configuration around the body of the core and throughout its length as the threads of a screw.

Such a ferromagnetic coating has been found to possess a substantially high positive and negative magnetic remanent induction and a substantially rectangular hysteresis characteristic. Consequently, selected length portions of the coating, in the direction of twist, are allowed to attain one or the other of two stable states, respectively characterized by the residual positive or negative remanent induction. A magnetic field along the direction of twist of $\pm$H oersteds switches the length portions from one state to another, whereas a field of $\pm H/2$ oersteds produces only negligible changes in the remanent induction.

A plurality of similar coils are separately wound about the coated wire and are positioned in a spaced side-by-side relationship with respect to one another to encompass and thereby define a corresponding plurality of helical path length portions of ferromagnetic material. Storage of binary information in a selected length portion of the coating is accomplished by sending a current impulse equal in magnitude to ($i_1$) into the conductive wire of the common core and simultaneously sending a current impulse equal in magnitude to ($i_2$) into the selected coil in such directions that the vector summation of the magnetic fields produced by the two coincident currents is equal in magnitude to $\pm$H oersteds and is oriented in the same direction as the twist or easy direction of magnetization of the coating.

During reading of the selected length portions of the coating, either the core or the corresponding coil is pulsed to individually develop a magnetic field of $\pm$H oersteds in the opposite direction from the field developed during storage of the function. In response to the read impulse, a signal is or is not avaliable on the core or the corresponding coil, depending upon which one was pulsed, according to whether the binary information 1 or 0, respectively, has or has not been established in the particular length section of the coating as represented by its remanent state.

Even though the "twistor" type of bistable magnetic storage device possesses many apparent desirable features, they are not yet considered commercially acceptable, as they are relatively expensive in requiring quite elaborate and complex extrusion techniques, the use of expensive materials, and an expenditure of a considerable amount of time and effort in order to form the ferromagnetic coating on the core, all of which undesirably add to the prohibitive cost of the finished product.

Therefore, the primary object of the present invention is to devise a new and improved method of commercially fabricating such bistable magnetic storage devices in a simple and economical manner.

Another object of the present invention is to devise such a fabrication process which does not require the use of expensive materials and machinery nor the necessity of utilization of skilled labor.

Still another object of the present invention is to devise such a new and improved fabrication process which is readily adaptable to mass production and automation techniques, thereby maintaining the cost of the finished product at a minimum.

A further object of the present invention is to devise a new and improved process of fabricating twistor-type bistable magnetic storage devices which are capable of being switched at speeds in the order of fractions of a microsecond and still possess all of the above-mentioned desirable characteristics.

Still another object of the present invention is to devise a new and improved process of fabricating twistor-type bistable magnetic storage devices which do not require the application of a continual longitudinal and/or torsional stress during operation thereof.

In accordance with one aspect of the present invention, the new and improved method of fabricating a bistable magnetic storage device comprises the steps of first electroplating a stress susceptible ferromagnetic coating onto an elongated substrate of electrically conductive material and thereafter applying and maintaining a substantially constant torsional stress to the coating relative to the longitudinal axis of the substrate and of an amount sufficient to establish in the coating an easy direction of magnetization which is oriented at an angle with respect to the longitudinal axis of the substrate.

In accordance with a further aspect of the present invention, the new and improved method of fabricating magnetic data storage devices having an elongated substrate of electrically conductive material comprises the steps of first applying a torsional stress to the substrate relative to the longitudinal axis thereof and then electroplating a stress susceptible ferromagnetic coating onto the substrate while the substrate is being subjected to the torsional stress. Thereafter, the substrate is allowed to approach its initial condition before the application of the torsional stress thereto, to estabilsh in the coating an easy direction of magnetization which is oriented in a helical direction with respect to the longitudinal axis of the substrate.

The novel features of the invention, as well as the invention itself, both as to its organization and as to its method of operation, will be understood in detail from the following description when considered in connection with the accompanying drawing, in which similar reference numerals refer to similar elements, and in which.

Figures 1, 2:
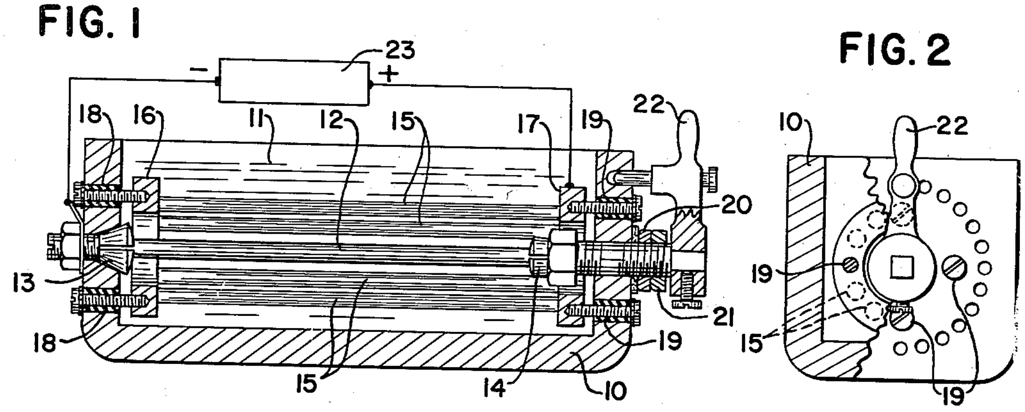
FIG. 1 is a cross-sectional view, partly schematic, of an apparatus utilized by the present invention.
FIG. 2 is an end view, partly in section, of the apparatus shown in FIG. 1.

In accordance with one aspect of the present invention, a container 10, shown in FIG. 1, is filled with an electrolyte 11 consisting of an aqueous salt solution of 50 grams per liter of ferrous chloride, 20 grams per liter of nickel chloride, 50 grams per liter of ammonium chloride, and 125 grams per liter of sodium citrate. The pH is maintained at 8.5 with ammonium hydroxide, and the temperature of the solution is maintained preferably at 90 degrees centigrade by any suitable means, not shown, but may be permitted to vary slightly if desired. An electrically conductive non-magnetic core, comprising a copper wire 12 having a diameter of approximately .012 inch, is suspended within container 10 by adjustable chucks 13 and 14 fixedly securing its ends against longitudinal and rotational movement. It is to be understood, of course, that various other ductile electrically conductive non-magnetic materials may be used with equal success so long as they are readily adaptable to electroplating techniques.

A plurality of metallic rods 15, composed of a suitable nickel-iron alloy of, say, 28% iron and 72% nickel, are suspended in the bath by metallic end rings 16 and 17 secured to the opposite ends thereof. Rods 15 are preferably disposed longitudinally in a circular configuration parallel to and equally spaced from one another, and form essentially a cylindrical cage construction concentrically disposed about core 12. End rings 16 and 17 are each held in a fixed position by bolts 18 and 19, respectively threaded therein, which are secured to but electrically insulated from container 10 by any suitable means. Core 12 is thereafter stretched by an amount only to insure tautness thereof by rotation of nut 20 in conjunction with the threaded shaft of chuck 14. Nut 20 is then locked against further rotational movement by lock nut 21 tightened thereagainst. Lever 22, affixed to the shaft extension of chuck 14, is rotated and angularly displaced by an amount approximately equal to 250 degrees per linear inch of the core, as long as the elastic limit of the core material is not exceeded.

Figure 3:
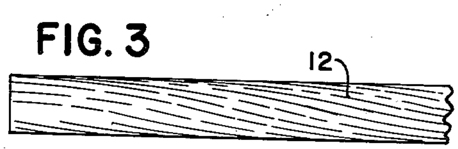
FIGS. 3 and 4 show a novel bistable magnetic storage device in different stages of fabrication in accordance with one aspect of the present invention.
Figure 4:
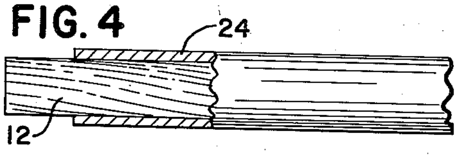

As the core is tautly stretched and twisted, the torsional stress within the molecular structure of the material is oriented in a helical direction about the longitudinal axis of the core, as shown diagrammatically by the dashed lines of FIG. 3. After the stretching and twisting operation is performed on the core, the positive terminal of a unidirectional power source 23 is connected to end ring 17, thence to rods 15, and the negative terminal thereof is connected to core 12 through chuck 13. Consequently, when supply 23 is energized to initiate the plating operations, core 12 functions as a cathode, and rods 15, as a unit, function as an anode. Therefore, due to the presence of electrolyte therebetween, an electron discharge path is established between core 12 and rods 15 in a well-known manner such that a coating of nickel-iron alloy is deposited on the outer surface of core 12 of a controlled thickness in accordance with well-known electroplating phenomena. The current density used during the plating process is preferably maintained at approximately 500 amperes per square foot of core material, and the plating current is applied for a time sufficient to deposit a thickness of ferromagnetic material on the core in the order of .0001 inch. It is desirable that the thickness of the coating be as thin as possible, so as to maintain eddy current losses therein at a minimum and yet be thick enough to insure an adequate output and still not fracture when torsional stresses are applied thereto.

Figure 5:
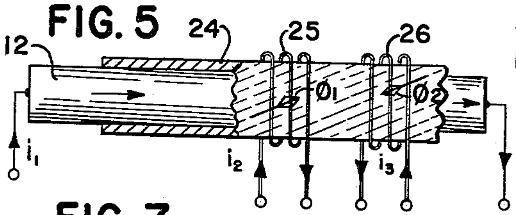
FIG. 5 illustrates a mode of operation of the fabricated device shown in FIGS. 3 and 4.
Figure 6:
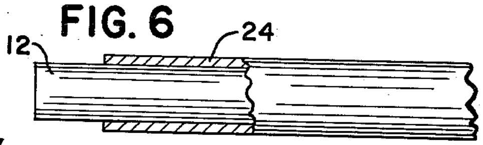
FIGS. 6 and 7 depict another novel bistable magnetic storage device in different stages of fabrication in accordance with another aspect of the present invention.
Figure 7:
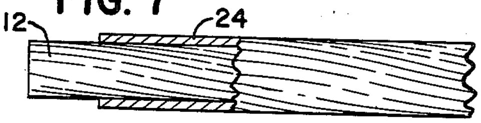

After the core has been plated, it is then removed from chucks 13 and 14 and allowed to approach its original state before being stretched and twisted, as diagrammatically shown in FIG. 5, which has intentionally been exaggerated for purposes of clarity. However, during the return of the core to its original state, the torsional strain established within the core during the original twisting thereof is immediately transmitted to coating 24 in such a manner that the easy direction of magnetization of the coating is oriented in a helical direction with respect to the longitudinal core axis and in an opposite direction from the initial torsional strain of the core, as diagrammatically shown by the dashed lines on coating 24 of FIG. 5. The ferromagnetic coating formed in this manner has been found to possess a substantially high positive and negative magnetic remanent induction and a substantially rectangular hysteresis characteristic. Consequently, selected length portions of coating 24 are capable of being magnetized in a helical direction in one or the other of two stable states along the direction of easy magnetization, respectively characterized by the positive or negative remanent induction. A magnetic field along the direction of twist of $\pm$H oersteds is capable of switching each length portion from one magnetic state to another, whereby a field of $\pm H/2$ oersteds produces only negligible changes in the remanent induction.

In operation of such a novel bistable magnetic storage device, a plurality of similar coils, illustratively shown as 25 and 26, are separately wound about the device and are positioned in a spaced side-by-side relationship with respect to one another to encompass and thereby define a corresponding plurality of length portions of ferromagnetic material. As previously described, storage of binary information (for example, a binary 1 in the selective length portion defined by coil 25) is accomplished by sending a current impulse equal in magnitude to ($i_1$) into the conducting wire of the common core 12 and simultaneously sending a current impulse equal in magnitude to ($i_2$) into coil 25 in the directions shown by the arrows. Consequently, the resultant magnetic fields produced by the two coincident currents is equal in magnitude to, say, +H oersteds and is oriented in the same direction as the easy direction of magnetization of coating 24, as shown by $\phi_1$. In order to store a binary 0, for example, impulses of opposite polarity than for the binary 1 are simultaneously applied to the core and the corresponding coil to produce a resultant magnetic field in the coating in the opposite direction as in binary 1, as shown by $\phi_2$ in the length portion defined by coil 26.

As before described, sensing of the magnetic remanent state of each of the selected length portions is accomplished simply by pulsing either the core or the corresponding coil. In response to the read pulse, a signal is or is not available in the common core or corresponding coil, depending upon which one was pulsed, according to whether a binary information 1 or 0 had been established in the particular length portion of the coating as represented by its remanent state.

During operation of the device, it has been found that with ambient temperature variations from 70 degrees Fahrenheit to 150 degrees Fahrenheit, the amplitude of the output signal remained substantially constant. With a further increase in operating temperature, the output decreased slowly to approximately 60% of maximum at a temperature of 400 degrees Fahrenheit, all of which is indicative of temperature stability.

Thus, in accordance with the present invention, there has been devised a new and improved process of fabricating a novel bistable magnetic storage device which does not require the external application of a continual elongation or twisting stress thereto during operation and in addition possesses all the desirable characteristics as before mentioned. In addition, the new and improved method of fabricating such devices is extremely simple, requires relatively inexpensive materials and apparatus, and is readily adaptable to automation techniques, thereby maintaining the cost of such devices at a minimum and thus rendering their use commercially acceptable.

Figure 8:
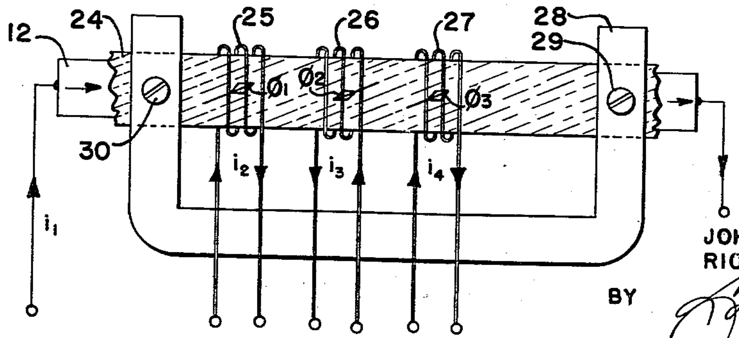
FIG. 8 illustrates a mode of operation of the fabricated device shown in FIGS. 6 and 7.

In accordance with another aspect of the present invention, core 12 is first plated with a ferromagnetic coating of the same thickness and in the same manner as before described. However, in this instance, the plating operation takes place while the core is in an untwisted condition. After the plating operation is completed, the coated core is placed in a jig 28, shown in FIG. 8, and is elongated and twisted as before by any suitable means, not shown. Thereafter, the ends of the device are maintained fixed against longitudinal or rotational movement during operation thereof by action of screws 29 and 30 threaded in jig 28. As the mode of operation of the second fabricated storage device is the same as the one before described, a detailed description thereof is not deemed necessary for a full and complete understanding of the second aspect of the present invention.

The novel bistable magnetic storage device constructed in accordance with the second aspect of the present invention has been found to possess an extremely fast switching time of less than two-tenths of a microsecond, which has not heretofore been possible. In addition to the greatly improved switching speed, the device also possesses all of the beforementioned desirable characteristics, and, again, the new and improved method of fabricating such devices is, as before, extremely simple, requires relatively inexpensive materials and apparatus, and is readily adaptable to mass production techniques.

While the forms of the invention shown and described herein are admirably adaptable to fulfill the objects primarily stated, it is to be understood that it is not intended to confine the invention to the forms or embodiments disclosed herein, for it is susceptible of embodiment in various other forms. For example, it is entirely within the purview of the present invention to maintain the core in a state of twist during the plating operation, releasing the core after the plating operation is completed, thereafter twisting the core in an opposite direction than during plating, and maintaining the core in its finally twisted condition. As a result, a much greater torsional strain is applied to the ferromagnetic coating, and consequently a much greater output is derived during operation of the device than before. Also, it may be desirable to store a definite amount of controlled stress in the ferromagnetic coating during the plating operation, which will additionally add to the output of the device during operation thereof. Again, it will become readily apparent to one skilled in the computer art that such a device is admirably well suited for incorporation in an extremely compact memory matrix simply by winding the operating coils around a bundle of plated cores and then connecting the electrically conductive elements of the cores and the coils in a two coordinate matrix system in a well-known manner.

What is claimed is:

1. The method of fabricating a magnetic data storage device comprising the steps of: electroplating a stress susceptible ferromagnetic coating onto an elongated substrate of electrically conductive material; and thereafter applying and maintaining a substantially constant torsional stress to said coating relative to the longitudinal axis of said substrate and of an amount sufficient to establish in said coating an easy direction of magnetization which is oriented at an angle with respect to said longitudinal axis.

2. The method of fabricating a magnetic data storage device comprising the steps of: electroplating a stress susceptible ferromagnetic coating onto an elongated core of electrically conductive material; and thereafter applying and maintaining a substantially constant torsional stress to said coating relative to the longitudinal axis of said core and of an amount sufficient to establish in said coating an easy direction of magnetization which is helically oriented with respect to said longitudinal axis.

3. The method of fabricating a magnetic data storage device comprising the steps of: electroplating a stress susceptible ferromagnetic coating onto an elongated metallic substrate; applying a torsional stress to said coating relative to the longitudinal axis of said substrate and of an amount sufficient to establish in said coating an easy direction of magnetization which is oriented at an angle with respect to said longitudinal axis; and maintaining said torsional stress to said coating.

4. The method of fabricating a magnetic data storage device comprising the steps of: electroplating a stress susceptible ferromagnetic coating onto an elongated and resilient substrate of electrically conductive material; applying a torsional stress to said coating relative to the longitudinal axis of said substrate and of an amount sufficient to establish in said coating an easy direction of magnetization which is helically oriented with respect to said longitudinal axis; and maintaining said torsional stress to said coating to retain the magnetic characteristics established therein.

5. The method of fabricating a magnetic data storage device comprising the steps of: electroplating a stress susceptible ferromagnetic coating onto an elongated, resilient and metallic core; and thereafter applying a substantially constant torsional stress to said coating relative to the longitudinal axis of said core and of an amount sufficient to establish and thereafter maintain in said coating an easy direction of magnetization which is oriented in a helical direction with respect to said longitudinal axis.

6. The method of fabricating a magnetic data storage device having an elongated substrate of electrically conductive material, comprising the steps of: applying a torsional stress to said substrate relative to the longitudinal axis thereof; electroplating a stress susceptible ferromagnetic coating onto said substrate while said substrate is being subjected to said torsional stress; and thereafter ceasing to apply said torsional stress and allowing said substrate to approach its initial condition before the application of said torsional stress thereto, to establish in said coating an easy direction of magnetization which is oriented in a helical direction with respect to said longitudinal axis.

7. The method of fabricating a magnetic data storage device having an elongated core of electrically conductive material, comprising the steps of: applying a torsional stress to said core relative to the longitudinal axis thereof; electroplating a stress susceptible ferromagnetic coating onto said core while said core is being subjected to said torsional stress; and thereafter ceasing to apply said torsional stress and allowing said core to approach its initial condition before the application of said torsional stress thereto, to establish in said coating an easy direction of magnetization which is helically oriented with respect to said longitudinal axis.

8. The method of fabricating a magnetic data storage device having an elongated substrate of electrically conductive material, comprising the steps of: applying a torsional stress to said substrate of an amount less than the elastic limit and relative to the longitudinal axis thereof; electroplating a stress susceptible ferromagnetic coating onto said substrate while said substrate is being subjected to said torsional stress; and thereafter ceasing to apply said torsional stress and allowing said substrate to approach its initial condition before the application of said torsional stress thereto, to establish in said coating an easy direction of magnetization which is oriented in a helical direction with respect to said longitudinal axis.

9. The method of fabricating a magnetic data storage device having an elongated substrate of electrically conductive material, comprising the steps of: applying a torsional stress to said substrate in one direction relative to the longitudinal axis thereof; electroplating a stress susceptible ferromagnetic coating onto said substrate while said substrate is being subjected to said torsional stress; and thereafter applying a torsional stress to said coating in the opposite direction relative to said longitudinal axis, to establish in said coating an easy direction of magnetization which is oriented in a helical direction with respect to said longitudinal axis; and maintaining said stress to said coating to retain the magnetic characteristics established therein.

References Cited in the file of this patent

UNITED STATES PATENTS

| | | |
|---|---|---|
| 145,285 | Dudley | Dec. 9, 1873 |
| 1,555,296 | Kirschner | Sept. 29, 1925 |
| 2,165,027 | Bitter | July 4, 1939 |
| 2,241,283 | Wackerle | May 6, 1941 |
| 2,680,710 | Kenmore et al. | June 8, 1954 |
| 2,724,103 | Ashenhurst | Nov. 15, 1955 |
| 2,743,507 | Kornei | May 1, 1956 |
| 2,746,130 | Davis | May 22, 1956 |
| 2,792,563 | Rajchman | May 14, 1957 |
| 2,911,317 | Garbor | Nov. 3, 1959 |
| 2,977,790 | Dubsky | Apr. 4, 1961 |
| 2,977,791 | Dubsky | Apr. 4, 1961 |